US010173668B2

(12) United States Patent
Macnamara et al.

(10) Patent No.: US 10,173,668 B2
(45) Date of Patent: Jan. 8, 2019

(54) APPARATUS AND METHOD FOR DETERMINING LOAD WEIGHT

(71) Applicant: Bendix Commercial Vehicle Systems LLC, Elyria, OH (US)

(72) Inventors: Joseph M. Macnamara, Ashland, OH (US); Jon D. Intagliata, Avon, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 134 days.

(21) Appl. No.: 15/361,704

(22) Filed: Nov. 28, 2016

(65) Prior Publication Data
US 2018/0148046 A1 May 31, 2018

(51) Int. Cl.
*B60W 30/00* (2006.01)
*B60W 30/04* (2006.01)
*B60W 10/00* (2006.01)
*B60W 10/22* (2006.01)
*B60W 40/13* (2012.01)
*B60W 10/188* (2012.01)
*B60W 10/184* (2012.01)

(52) U.S. Cl.
CPC .......... *B60W 30/04* (2013.01); *B60W 10/184* (2013.01); *B60W 10/188* (2013.01); *B60W 10/22* (2013.01); *B60W 40/13* (2013.01); *B60W 2040/1307* (2013.01)

(58) Field of Classification Search
CPC .................................... B60T 8/17; B60T 8/18
See application file for complete search history.

(56) References Cited

U.S. PATENT DOCUMENTS

| 6,308,793 B1 * | 10/2001 | Eberling ............ B60G 17/0195 137/625.66 |
| 7,240,911 B1 | 7/2007 | Escalante |
| 7,976,040 B2 | 7/2011 | Stahl |
| 8,360,451 B2 | 1/2013 | Hammond |
| 9,238,392 B2 | 1/2016 | Geiger et al. |
| 9,272,599 B1 | 3/2016 | Cook, Jr. et al. |

(Continued)

FOREIGN PATENT DOCUMENTS

| AU | 2005211687 B2 | 6/2007 |
| CN | 204459744 U | 7/2015 |

(Continued)

*Primary Examiner* — Yonel Beaulieu
(74) *Attorney, Agent, or Firm* — Brian E. Kondas; Cheryl L. Greenly; Eugene E. Clair

(57) ABSTRACT

A controller determines a load weight associated with a plurality of pneumatically independent circuits of a vehicle suspension system. The controller is adapted to receive a first electronic pressure signal, which is based on a first pneumatic signal representative of a first pneumatic pressure in a first of the plurality of pneumatically independent circuits, and receive a second electronic pressure signal, which is based on a second pneumatic signal representative of a second pneumatic pressure in a second of the plurality of pneumatically independent circuits. The controller is also adapted to determine the load weight based on the first electronic pressure signal and the second electronic pressure signal. The controller is also adapted to control an operation of a function of an associated vehicle based on the load weight.

26 Claims, 2 Drawing Sheets

(56) References Cited

U.S. PATENT DOCUMENTS

| | | | |
|---|---|---|---|
| 2002/0066605 A1* | 6/2002 | McClelland | B60G 17/0195 180/24.02 |
| 2002/0074746 A1* | 6/2002 | Eberling | B60G 17/0155 280/5.5 |
| 2008/0185549 A1 | 8/2008 | Steinbuchel et al. | |
| 2008/0224428 A1 | 9/2008 | Smith et al. | |
| 2013/0234411 A1 | 9/2013 | Hapyuk | |
| 2014/0297118 A1* | 10/2014 | Eberling | B60G 17/005 701/38 |
| 2015/0197133 A1 | 7/2015 | VanRaaphorst | |
| 2017/0096128 A1* | 4/2017 | Correndo | B60T 8/1893 |
| 2018/0148024 A1* | 5/2018 | Macnamara | B60T 8/1755 |

FOREIGN PATENT DOCUMENTS

| | | |
|---|---|---|
| CN | 103802630 B | 12/2015 |
| NZ | 562844 A | 12/2009 |
| WO | 2005090104 A1 | 9/2005 |

\* cited by examiner

APPARATUS AND METHOD FOR DETERMINING LOAD WEIGHT

BACKGROUND

The present invention relates to determining a load weight of a vehicle. It finds particular application in conjunction with independent pneumatic circuits and will be described with particular reference thereto. It will be appreciated, however, that the invention is also amenable to other applications.

A typical Trailer Roll Stability Program (TRSP) measures air pressure on an air suspension and converts the pressure reading to a load percentage, and even to an interpreted weight, based on a single pressure input, which is either integrated via a port on the TRSP valve or with an external electrically connected pressure sensor. Since air-bags in an air suspension are typically all pneumatically connected, the air pressure in any one air bag is representative of the pressure of the entire air bag circuit. The leveling or height control valve allows air in or out of the air suspension circuit based on the load placed on the suspension. A height control valve activates based on both vehicle empty sprung weight and payload added or removed to/from the vehicle. The pressure in any one air bag typically does not vary much from any other air bag in the system, which comes to equilibrium within a relatively short amount of time. The air bags along with electronic filtering act to give a stable signal from a pressure measurement perspective. From a TRSP perspective a single measurement is adequate to interpret the load on the trailer.

Some air suspension systems have multiple independently controlled pneumatic circuits that don't equilibrate to a single pressure. One example of such an independently controlled pneumatic system is a dual-circuit pneumatic system having independent circuits on respective sides of a vehicle. Other examples of such systems have independently controlled pneumatic circuits for respective vehicle axles or even individual air bags.

From a TRSP perspective, since pneumatic pressure in one of the circuits may not match the pneumatic pressure(s) in the other circuit(s), multi-circuit pneumatic circuits for air bag suspension control systems may be problematic. More specifically, there is not a single pneumatic pressure on which the load percentage or interpreted weight may be based.

The present invention provides a new and improved apparatus and method for determining a load weight.

SUMMARY

In one aspect of the present invention, it is contemplated that a controller determines a load weight associated with a plurality of pneumatically independent circuits of a vehicle suspension system. The controller is adapted to receive a first electronic pressure signal, which is based on a first pneumatic signal representative of a first pneumatic pressure in a first of the plurality of pneumatically independent circuits, and receive a second electronic pressure signal, which is based on a second pneumatic signal representative of a second pneumatic pressure in a second of the plurality of pneumatically independent circuits. The controller is also adapted to determine the load weight based on the first electronic pressure signal and the second electronic pressure signal. The controller is also adapted to control an operation of a function of an associated vehicle based on the load weight.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
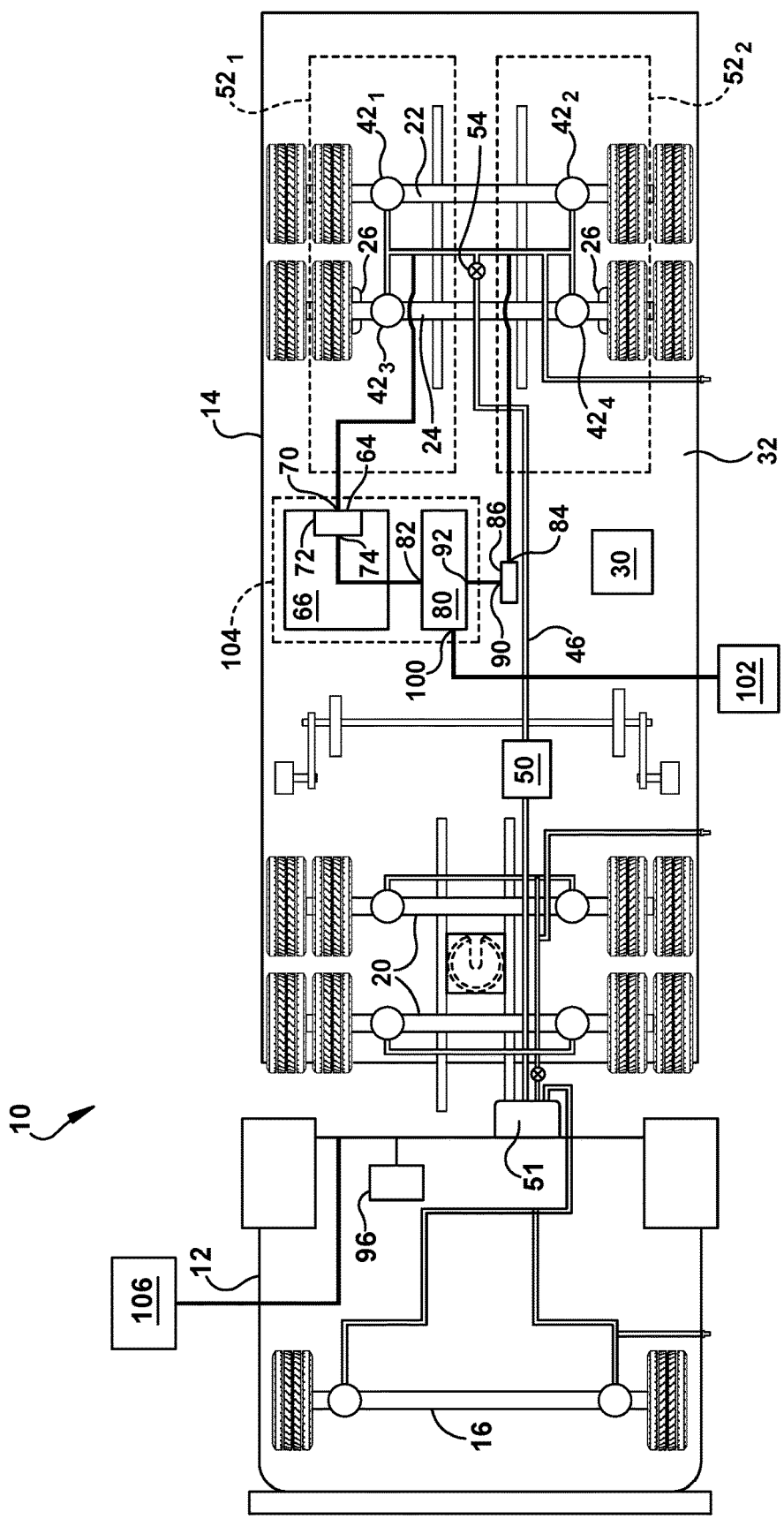
FIG. 1 illustrates a schematic representation of an exemplary system for determining a load weight associated with a plurality of pneumatically independent circuits of a vehicle suspension system in accordance with one embodiment of an apparatus illustrating principles of the present invention.

With reference to FIG. 1, a schematic representation of an exemplary system for determining a load weight associated with a plurality of pneumatically independent circuits of a vehicle suspension system is illustrated in accordance with one embodiment of the present invention. A vehicle 10 includes a towing portion 12 (e.g., a tractor) and a towed portion 14 (e.g., a trailer).

The tractor 12 is removably coupled to the trailer 14. The tractor 12 includes a tractor steer axle 16 and a tractor drive axle 20. In the illustrated embodiment, two (2) rear axles collectively comprise the tractor drive axle 20.

The trailer 14 includes a trailer stationary axle 22 and a trailer lift axle 24. Although only one (1) trailer stationary axle 22 is shown in the illustrated embodiment, it is to be understood that other arrangements including other numbers of axles or groups of axles are contemplated in other embodiments.

At least one lift air bag 26 (e.g., bellow) is deflated/inflated to set a position (e.g., a height) of the trailer lift axle 24 based on, for example, a weight of a load 30 (e.g., a load weight) on a bed 32 of the trailer 14. Although, for purposes of illustration, the load 30 is only illustrated as a small package on one side of the trailer bed 32, it is to be understood that the load 30 may be any size and on one side, the other side, or both sides (either evenly or unevenly) of the trailer bed 32. In one example, the height of the trailer lift axle 24 moves between a maximum height (e.g., fully retracted) position and a minimum height (e.g., fully extended) position. The trailer lift axle 24 is biased by a spring, for example, to the maximum height. Therefore, to set the height of the trailer lift axle 24 to the maximum height (e.g., fully retracted) position, the at least one lift bag 26 is substantially fully inflated. Conversely, to set the height of the trailer lift axle 24 to the minimum height (e.g., fully extended) position, the at least one lift bag 26 is substantially fully deflated to overcome the bias of the spring associated with the trailer lift axle 24. In the fully retracted position, the height is the distance (e.g., six (6) inches) between a surface of the road on which the vehicle 10 is traveling and a tire associated with the trailer lift axle 24 when the at least one lift bag 26 is substantially fully inflated. In the fully extended position, the height is zero (0)

feet off of the road surface (since the tire associated with the trailer lift axle 24 is travelling on the road surface). It is to be understood that any height of the trailer lift axle 24 between the maximum height and the minimum height is achieved by partially deflating/inflating the at least one lift bag 26.

The trailer 14 includes an air-ride suspension that includes at least two (e.g., four (4)) suspension air bags $42_1$, $42_2$, $42_3$, $42_4$ (collectively 42). The suspension air bags 42 are supplied with air through a pneumatic line 46 (e.g., air line), which extends from an air reservoir 50 (e.g., tank) mounted to the trailer 14. It is to be understood the tank 50 receives pneumatic fluid from a source (e.g., a reservoir 51) on the tractor 12. The air-ride suspension typically includes an air leveler, which is known in the art.

When the trailer lift axle 24 is at the minimum height (e.g., fully extended), the suspension air bags $42_1$, $42_3$ fluidly communicate with each other and are part of a first pneumatic circuit $52_1$. The suspension air bags $42_2$, $42_4$ fluidly communicate with each other and are part of a second pneumatic circuit $52_2$. The first and second pneumatic circuits $52_1$, $52_2$ (collectively 52) are fluidly independent (e.g., isolated) from each other. Therefore, although the suspension air bags 42 are supplied with air through the pneumatic line 46, first and second height control valves $54_1$, $54_2$ (collectively 54) fluidly isolates the suspension air bags $42_1$, $42_3$ from the suspension air bags $42_2$, $42_4$, thereby creating the respective independent (e.g., isolated) pneumatic circuits $52_1$, $52_2$.

When the trailer lift axle 24 is at the maximum height (e.g., fully retracted), the first pneumatic circuit $52_1$ only includes the suspension air bag $42_1$ and the second pneumatic circuit $52_2$ only includes the suspension air bag $42_2$. For purposes of the below discussion, it is assumed that the trailer lift axle 24 is at the minimum height (e.g., fully extended) so that the first pneumatic circuit $52_1$ includes both the suspension air bag $42_1$, $42_3$ and the second pneumatic circuit $52_2$ includes both the suspension air bag $42_2$, $42_4$.

The respective pressures in the pneumatic circuits 52 are based on and represent the weight of the load 30 (i.e., the load weight) on the bed 32 of the trailer 14.

The first pneumatic circuit $52_1$ fluidly communicates with a pneumatic input 64 of a brake valve 66. A first pneumatic input 70 of a first pneumatic to electrical converter 72 fluidly communicates with and senses the pneumatic pressure received at the pneumatic input 64 of the brake valve 66. The first converter 72 converts the sensed pneumatic pressure to a first electrical signal and transmits the first electrical signal, which is based on and represents the sensed pneumatic pressure, from a first electrical output 74.

An electronic control unit (ECU) 80 (e.g., a controller) electrically communicates with the first electrical output 74 of the first converter 72 and is adapted to receive the first electrical signal, at a first ECU electrical input port 82. The first electrical signal is based on and represents the sensed pneumatic pressure at the pneumatic input 64 of the brake valve 66. A second pneumatic input 84 of a second pneumatic to electrical converter 86 fluidly communicates with and senses the pneumatic pressure in the second pneumatic circuit $52_2$. The second converter 86 converts the sensed pneumatic pressure to a second electrical signal and transmits the second electrical signal, which is based on and represents the sensed pneumatic pressure, from a second electrical output 90 to a second ECU electrical input port 92.

The ECU 80 receives an electrical control signal from a control mechanism 96. The ECU 80 is adapted to identify an algorithm for determining a pressure value used for determining the load weight based on the received control signal. In one embodiment, the control mechanism 96 is located in a vehicle operator compartment of the tractor 12 and communicates with the ECU 80 via either power line carrier (PLC) signals or wireless communication. In this embodiment, an operator of the vehicle 10 is capable of selecting the algorithm, which the ECU 80 uses for determining the pressure value, via the control mechanism 96. In another embodiment, the control mechanism 96 is not accessible by the operator of the vehicle 10 and, instead, is programmed into the ECU 80 by a technician either at the time of manufacture or maintenance.

Different algorithms that are contemplated for determining the pressure value include an averaging algorithm, a maximum algorithm, and a minimum algorithm.

If the averaging algorithm is identified, the ECU 80 determines the pressure value based on an average of the pressure represented by the first electronic pressure signal (the first electrical signal) and the pressure represented by the second electronic pressure signal (the second electrical signal). For example, the ECU 80 uses an average of the respective pressures represented by the first electronic pressure signal (the first electrical signal) and the pressure represented by the second electronic pressure signal (the second electrical signal) for determining the pressure value.

If the maximum algorithm is identified, the ECU 80 determines the pressure value based on a maximum of the first electronic pressure signal (the first electrical signal) and the pressure represented by the second electronic pressure signal (the second electrical signal). For example, the ECU 80 uses the maximum of the respective pressures represented by the first electronic pressure signal (the first electrical signal) and the pressure represented by the second electronic pressure signal (the second electrical signal) for determining the pressure value.

If the minimum algorithm is identified, the ECU 80 determines the pressure value based on a minimum of a plurality of electronic pressure signals (e.g., a minimum of the first electronic pressure signal (the first electrical signal) and the pressure represented by the second electronic pressure signal (the second electrical signal)). For example, the ECU 80 uses the minimum of the respective pressures represented by the first electronic pressure signal (the first electrical signal) and the pressure represented by the second electronic pressure signal (the second electrical signal) for determining the pressure value.

The operator of the vehicle 10 may set different algorithms for determining the load weight based on different driving conditions. For example, if the operator suspects the vehicle 10 has a relatively higher center of gravity, the operator may select the maximum algorithm so, for example, the TRSP system may be more sensitive.

Although only three (3) algorithms are discussed above, it is to be understood that other algorithms are also contemplated for determining the pressure value.

The ECU 80 is also adapted to determine the weight of the load 30 (i.e., the load weight) on the bed 32 of the trailer 14. It is also contemplated that the ECU 80 is also adapted to determine the respective weights supported by each of the pneumatically independent circuits 52 and thus determine and report load distribution on the bed 32 of the trailer 14. Therefore, the ECU 80 is capable of comparing weights associated with each of the pneumatically independent circuits 52 and identify a variation between the weights above a predetermined threshold variation and report as an imbalanced load on the bed 32 of the trailer 14. For example, the ECU 80 determines a first percentage of the load 30 is supported by the first pneumatically independent circuit 52$_1$ and a second percentage of the load 30 is supported by the second pneumatically independent circuit 52$_2$, where the first and second percentages add to 100 percent of the load 30.

The ECU 80 is also adapted to determine the load weight based on the pressure value. In one embodiment, the load weight is linearly related to the pressure value. Therefore, the load weight is determined as:

$y=mx+b$, where y=Load Weight (pounds);
x=Pressure Value represented by the electrical signal (pounds per square inch (psi));
m=Slope; and
b=Constant based on the weight of the trailer axles when the air bag pressure is at zero (0).

In one embodiment, the slope (m) is provided by the manufacturer of the suspension with the air bags 42 on the vehicle trailer 14. For purposes of discussion, the slope (m) is assumed to be a constant.

An operation of a function of the vehicle 10 is controlled based on the load weight (y). It is contemplated that the vehicle function is at least one of a roll stability function (e.g., a trailer roll stability function), an antilock braking function, a lift axle control function, a load imbalance reporting function, a load distribution reporting function, etc. If the function is the roll stability function, the controller 80 is adapted to control the operation of the roll stability function by setting a threshold of a parameter, based on the load weight, at which an automated braking associated with the roll stability function occurs.

In one embodiment, the parameter is a lateral acceleration of the vehicle 10. In this case, the controller 80 is adapted to control the operation of the roll stability function by decreasing (e.g., linearly decreasing) the threshold of the lateral acceleration (e.g., the parameter) at which the automated braking occurs as the load weight increases. In other words, the automated braking is initiated with relatively lower lateral acceleration and, therefore, is said to be more sensitive to lateral acceleration of the vehicle 10. Conversely, the controller 80 is adapted to control the operation of the roll stability function by increasing (e.g., linearly increasing) the threshold of the lateral acceleration (e.g., the parameter) at which the automated braking occurs as the load weight decreases.

In one example, the controller 80 is adapted to linearly decrease the lateral acceleration threshold at which the automated braking occurs from about 4.0 m/s$^2$ at a load weight of about 20% of a maximum rated load weight of the vehicle 10 to about 2.5 m/s$^2$ at a load weight of about 80% of a maximum rated load weight of the vehicle 10.

The controller 80 is adapted to transmit an electrical load weight signal from an ECU electrical output 100. In one embodiment, the electrical load weight signal is transmitted to a device 102 for displaying and/or recording the load weight. For example, the electrical load weight signal may be transmitted to the device 102 electrically connected to the ECU electrical output 100. In another example, the electrical load weight signal may be transmitted as a PLC signal to a device 106 in the tractor 12. It is also contemplated that the electrical load weight signal may be wirelessly transmitted from the ECU 80, the device 102 and/or the device 106.

The controller 80 is also capable of receiving an electronic lift axle height signal at a controller input from the trailer lift axle 24. It is contemplated that the electronic lift axle height signal is received at a separate ECU electrical input (not shown). The lift axle height signal indicates a current height of the trailer lift axle 24.

The controller 80 determines a desired height of the trailer lift axle 24 based on the load weight. For example, if the load weight is at least a predetermined threshold, it is determined that the trailer lift axle 24 should be in the fully extended position. Or, if the load weight is not at least a predetermined threshold, it is determined that the trailer lift axle 24 should be in the fully retracted position.

If the lift axle height signal indicates the trailer lift axle 24 is not within a predetermined range (e.g., 6 inches) of the desired position, the controller 80 transmits a signal for setting the trailer lift axle 24 to within the predetermined range of the desired position. Although the trailer lift axle 24 is only described as being in the fully retracted or fully extended position, it is to be understood any height between these positions is also contemplated.

Although the brake valve 66 and the controller 80 are described as separate components, it is also contemplated that the brake valve 66 and the controller 80 are integrated into a combined brake valve and controller 104. The combined brake valve and controller 104 includes a brake valve portion (e.g., the brake valve 66) and a controller portion (e.g., the controller 80).

Figure 2:
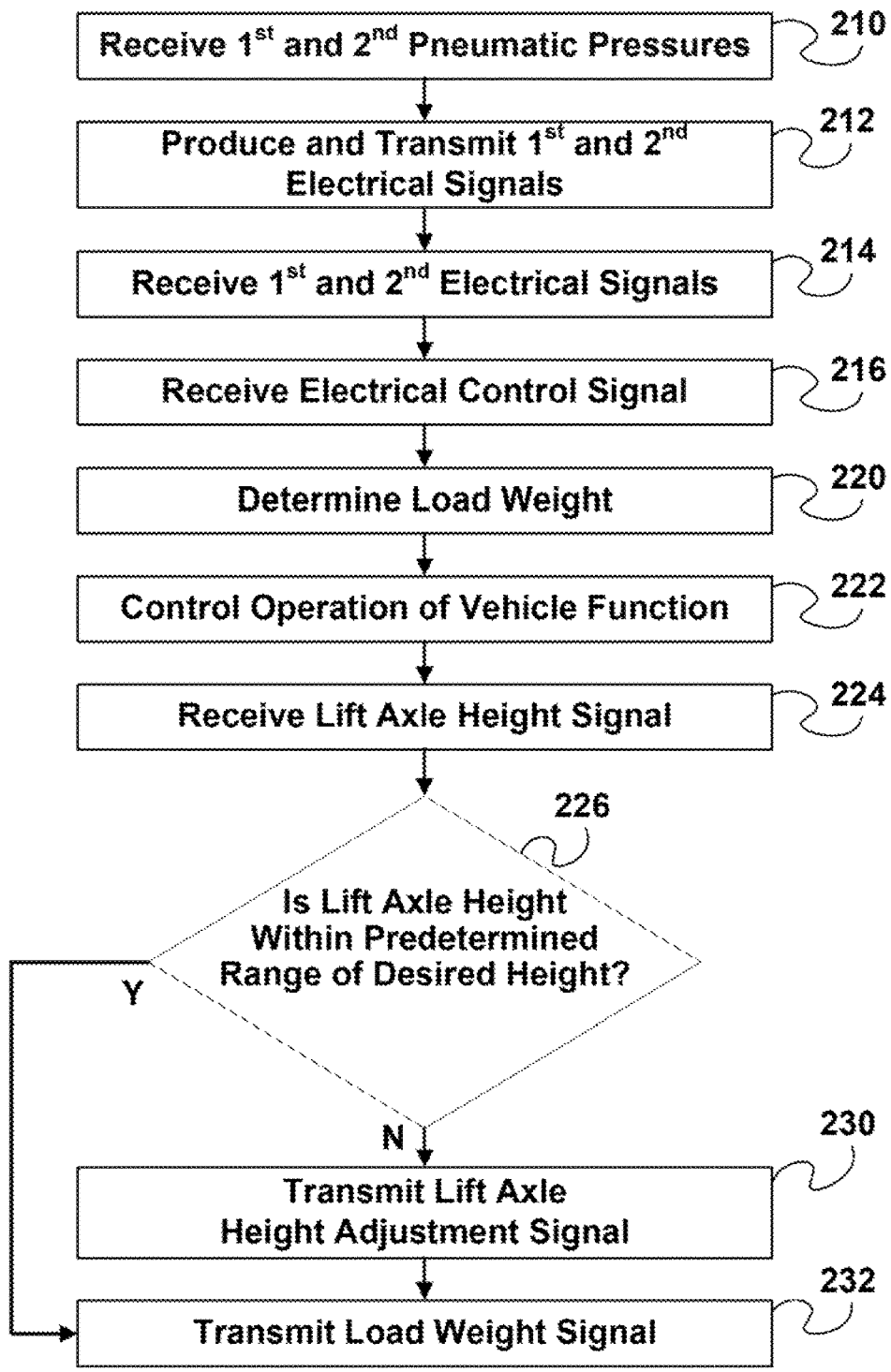
FIG. 2 is an exemplary methodology of determining a load weight in accordance with one embodiment illustrating principles of the present invention.

With reference to FIG. 2, an exemplary methodology of the system shown in FIG. 1 for determining a load weight is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1 and 2 in a step 210, the first pneumatic to electrical converter 72 receives the first pneumatic pressure of the first pneumatic circuit 52$_1$ and the second pneumatic to electrical converter 86 receives the second pneumatic pressure of the second pneumatic circuit 52$_2$. In a step 212, the first pneumatic to electrical converter 72 produces and transmits the first electrical signal and the second pneumatic to electrical converter 86 produces and transmits the second electrical signal. In a step 214, the controller 80 receives the first and second electrical signals. In a step 216, the controller 80 receives the electrical control signal from the control mechanism 96. The controller 80 determines the load weight, as discussed above, in a step 220, based on the first and second electrical signals and the control signal. The controller 80 controls the operation of the vehicle function (e.g., the roll stability function) in a step 222.

The controller 80 receives the lift axle height signal in a step 224. Then, the controller 80 determines if the lift axle height is within the predetermined range of the desired height in a step 226. If the lift axle height is not within the predetermined range of the desired height, the controller 80 transmits an electronic lift axle height adjustment signal, for setting the lift axle 24 to be within the predetermined range of the desired position, in a step 230. The controller 80 then transmits the electronic load weight signal as discussed above in a step 232.

Otherwise, if the lift axle height is within the predetermined range of the desired height, control passes directly from the step 226 to the step 232.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller for determining a load weight associated with a plurality of pneumatically independent circuits of a vehicle suspension system, the controller adapted to:
receive a first electronic pressure signal based on a first pneumatic signal representative of a first pneumatic pressure in a first of the plurality of pneumatically independent circuits;
receive a second electronic pressure signal based on a second pneumatic signal representative of a second pneumatic pressure in a second of the plurality of pneumatically independent circuits;
determine the load weight based on the first electronic pressure signal and the second electronic pressure signal; and
control an operation of a function of an associated vehicle based on the load weight.

2. The controller for determining a load weight as set forth in claim 1, the controller adapted to:
receive a control signal;
identify an algorithm for determining the load weight based on the control signal; and
determine the load weight, according to the algorithm, based on the first electronic pressure signal and the second electronic pressure signal.

3. The controller for determining a load weight as set forth in claim 2, the controller adapted to identify the algorithm as one of:
an averaging algorithm, a maximum algorithm, and a minimum algorithm.

4. The controller for determining a load weight as set forth in claim 3, the controller adapted to:
if the averaging algorithm is identified, determine the load weight based on an average of the pressure represented by the first electronic pressure signal and the pressure represented by the second electronic pressure signal;
if the maximum algorithm is identified, determine the load weight based on a maximum of the first electronic pressure signal and the second electronic pressure signal; and
if the minimum algorithm is identified, determine the load weight based on a minimum of the first electronic pressure signal and the second electronic pressure signal.

5. The controller for determining a load weight as set forth in claim 1, wherein:
the first electronic pressure signal is received at a first controller electronic input port; and
the second electronic pressure signal is received at a second controller electronic input port.

6. The controller for determining a load weight as set forth in claim 1, wherein:
the function is at least one of a roll stability function, an antilock braking function, a lift axle function, a load imbalance reporting function and a load distribution reporting function.

7. The controller for determining a load weight as set forth in claim 1, wherein:
the function is a roll stability function; and
the controller is further adapted to control the operation of the roll stability function by setting a threshold of a parameter, based on the load weight, at which an automated braking associated with the roll stability function occurs.

8. The controller for determining a load weight as set forth in claim 7, the controller adapted to:
decrease the threshold of the parameter at which the automated braking occurs as the load weight increases.

9. The controller for determining a load weight as set forth in claim 8, wherein:
the parameter is a lateral acceleration of the associated vehicle.

10. The controller for determining a load weight as set forth in claim 8, the controller adapted to:
linearly decrease the threshold of the parameter at which the automated braking occurs as the load weight increases.

11. The controller for determining a load weight as set forth in claim 10, the controller adapted to:
linearly decrease the lateral acceleration threshold at which the automated braking occurs from about 4.0 m/s$^2$, when a load weight of the associated vehicle is about 20% of a maximum rated load weight of the associated vehicle, to about 2.5 m/s$^2$, when the load weight of the associated vehicle is about 80% of the maximum rated load weight of the associated vehicle.

12. The controller for determining a load weight as set forth in claim 1, the controller adapted to:
receive an electronic lift axle height signal;
determine if the lift axle height is within a predetermined range of a desired height based on the load weight; and
if the lift axle height is not within a predetermined range of a desired height, transmit an electronic lift axle height adjustment signal for setting the lift axle height to be within the predetermined range of the desired height.

13. A combined brake valve and controller, the combined brake valve and controller comprising:
a brake valve portion, including:
a pneumatic input receiving a first pneumatic signal representative of a pneumatic pressure in a first of a plurality of pneumatically independent circuits supporting a load;
a pneumatic to electrical converter sensing a pressure of the first pneumatic signal and transmitting a first electrical signal indicative of the pressure of the first pneumatic signal; and
a controller portion adapted to:
receive the first electrical signal indicative of the pressure in the first pneumatically independent circuit;
receive a second electrical signal indicative of a pressure in a second of the pneumatically independent circuits;
determine a weight of the load based on the first electrical signal and the second electrical signal; and
control an operation of a function of an associated vehicle based on the load weight.

14. The combined brake valve and controller as set forth in claim 13, the controller portion adapted to:

receive a control signal;
identify an algorithm for determining the load weight based on the control signal; and
determine the load weight, according to the algorithm, based on the first electronic pressure signal and the second electronic pressure signal.

15. The combined brake valve and controller as set forth in claim 14, the controller portion adapted to identify the algorithm as one of:
an averaging algorithm, a maximum algorithm, and a minimum algorithm.

16. The combined brake valve and controller as set forth in claim 15, the controller portion adapted to:
if the averaging algorithm is identified, determine the load weight based on an average of the pressure represented by the first electronic pressure signal and the pressure represented by the second electronic pressure signal;
if the maximum algorithm is identified, determine the load weight based on a maximum of the first electronic pressure signal and the second electronic pressure signal; and
if the minimum algorithm is identified, determine the load weight based on a minimum of the first electronic pressure signal and the second electronic pressure signal.

17. The combined brake valve and controller as set forth in claim 13, wherein:
the function is at least one of a roll stability function, an antilock braking function, and a lift axle function.

18. The combined brake valve and controller as set forth in claim 13, wherein:
the function is a roll stability function; and
the controller is further adapted to control the operation of the roll stability function by setting a threshold of a lateral acceleration, based on the load weight, at which an automated braking associated with the roll stability function occurs.

19. The combined brake valve and controller as set forth in claim 18, the controller adapted to:
decrease the threshold of the lateral acceleration at which the automated braking occurs as the load weight increases.

20. The combined brake valve and controller as set forth in claim 19, the controller adapted to:
linearly increase the threshold of the parameter at which the automated braking occurs as the load weight decreases.

21. A method for determining a load weight associated with a plurality of pneumatically independent circuits of a vehicle suspension system, the method comprising:
receiving a first electronic pressure signal based on a first pneumatic signal representative of a first pneumatic pressure in a first of the plurality of pneumatically independent circuits;
receiving a second electronic pressure signal based on a second pneumatic signal representative of a second pneumatic pressure in a second of the plurality of pneumatically independent circuits;
determining the load weight based on the first electronic pressure signal and the second electronic pressure signal; and
controlling an operation of a function of an associated vehicle based on the load weight.

22. The method for determining a load weight as set forth in claim 21, further including:
receiving a control signal;
identifying an algorithm for determining the load weight based on the control signal; and
determining the load weight, according to the algorithm, based on the first electronic pressure signal and the second electronic pressure signal.

23. The method for determining a load weight as set forth in claim 22, further including:
identifying the algorithm as an averaging algorithm, a maximum algorithm, and a minimum algorithm;
if the averaging algorithm is identified, determining the load weight based on an average of the pressure represented by the first electronic pressure signal and the pressure represented by the second electronic pressure signal;
if the maximum algorithm is identified, determining the load weight based on a maximum of the first electronic pressure signal and the second electronic pressure signal; and
if the minimum algorithm is identified, determining the load weight based on a minimum of the first electronic pressure signal and the second electronic pressure signal.

24. The method for determining a load weight as set forth in claim 21, wherein the function is a roll stability function, the method further including:
controlling the operation of the roll stability function by setting a threshold of a parameter, based on the load weight, at which an automated braking associated with the roll stability function occurs.

25. The method for determining a load weight as set forth in claim 24, further including:
decreasing the threshold of the parameter at which the automated braking occurs as the load weight increases.

26. The method for determining a load weight as set forth in claim 25, further including:
linearly decreasing the lateral acceleration threshold at which the automated braking occurs from about 4.0 m/s$^2$, when a load weight of the associated vehicle is about 20% of a maximum rated load weight of the associated vehicle, to about 2.5 m/s$^2$, when the load weight of the associated vehicle is about 80% of the maximum rated load weight of the associated vehicle.

* * * * *